Feb. 14, 1967   W. S. BANZHOF, JR   3,303,550
METHODS OF FABRICATING WOUND ELECTRICAL CAPACITORS
Filed Aug. 23, 1965   2 Sheets-Sheet 1
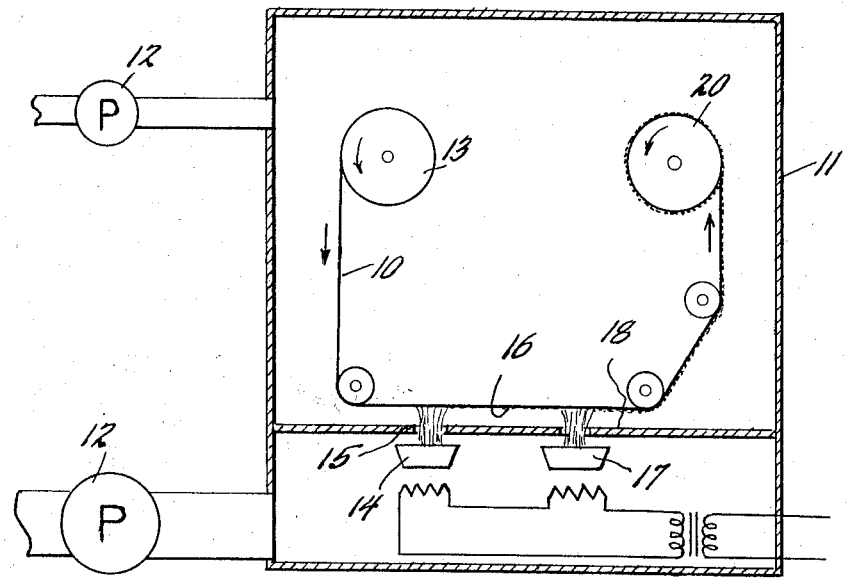
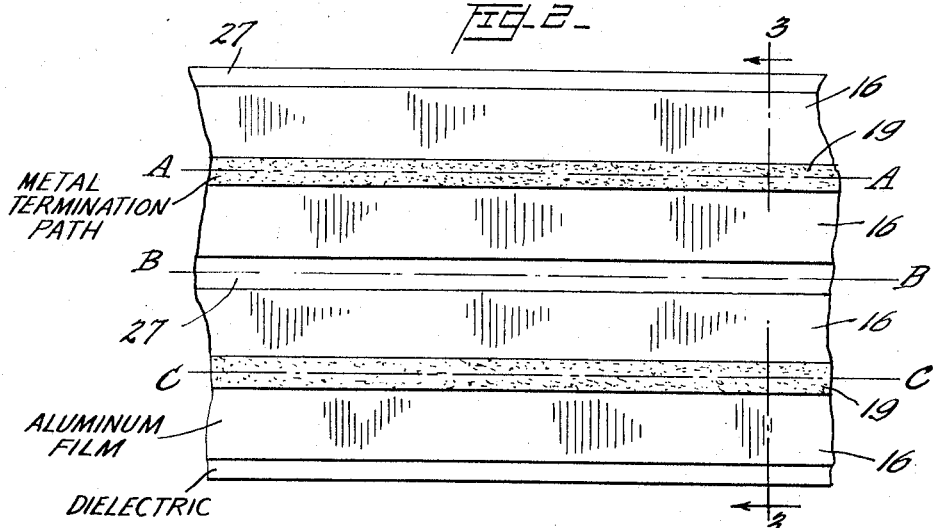
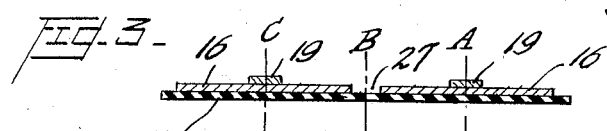
INVENTOR
W. S. Banzhof, Jr.,
BY S. Gundersen
ATTORNEY Feb. 14, 1967  W. S. BANZHOF, JR  3,303,550
METHODS OF FABRICATING WOUND ELECTRICAL CAPACITORS
Filed Aug. 23, 1965  2 Sheets-Sheet 2
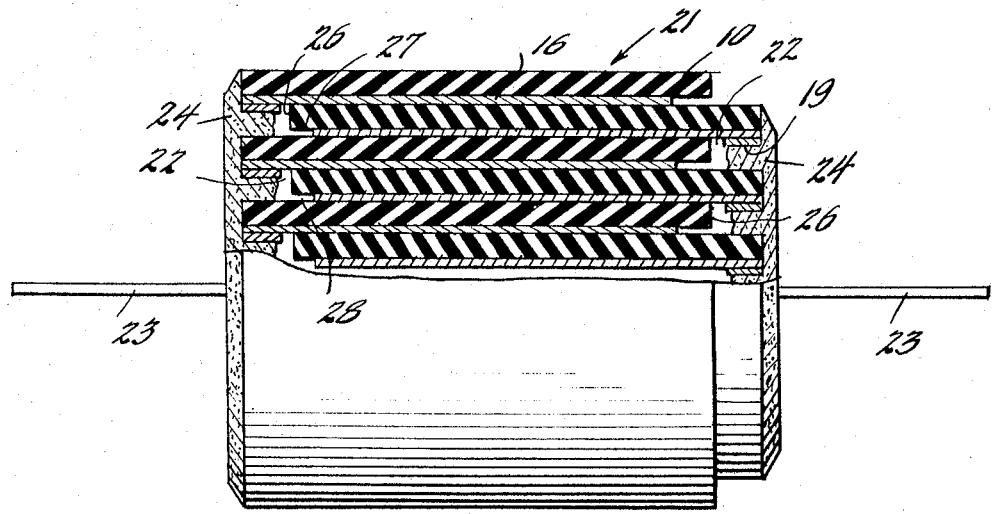
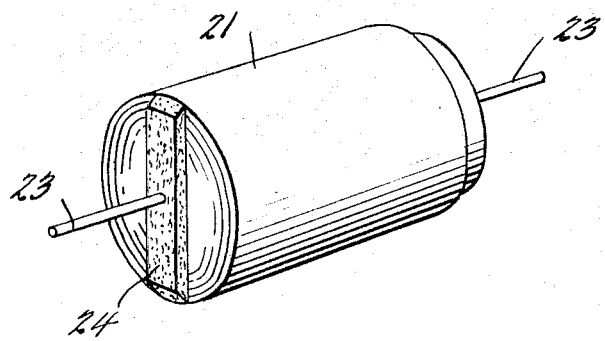

United States Patent Office 3,303,550
Patented Feb. 14, 1967

3,303,550
METHODS OF FABRICATING WOUND
ELECTRICAL CAPACITORS
William S. Banzhof, Jr., Clemmons, N.C., assignor to
Western Electric Company, Incorporated, New York,
N.Y., a corporation of New York
Filed Aug. 23, 1965, Ser. No. 481,871
2 Claims. (Cl. 29—25.42)

This invention relates to metallized film electrical capacitors and methods of fabrication thereof, and particularly to thin metallized film wound capacitors having improved terminations and methods of fabricating such devices with improved terminations.

Wound electrical capacitors are usually made by offsetting and winding two metallized dielectric sheets into a roll and then making terminations to the respective metal films by soldering a terminal to each end of the roll. However, when such a capacitor is wound, the spaces into which the solder must flow in order to contact the metallized film and connect the terminals therewith is extremely small, often being as small as .0001 inch. Moreover, the amount of offset is also relatively small so that very little area of the metallized film is actually exposed to the solder. Consequently, such soldered connections are weak, and as a result the capacitors are not generally suitable for use requiring high reliability over prolonged periods of time, such as in communication, missile and space applications.

Furthermore, when aluminum is used as the metallized film, other problems develop, the primary one being that aluminum oxidizes rapidly when exposed to the atmosphere following deposition, thus providing a thin coating of aluminum oxide that prohibits effective and reliable soldering of the terminations to the aluminum. Specifically, the aluminum oxide acts as a barrier to the solder, preventing its diffusion through the aluminum and thus preventing any metallurgical bonding between the solder and the aluminum. The best that can be obtained by the application of solder to the oxide coated aluminum is a mechanical connection. Moreover, aluminum oxide does not have an affinity towards solder and thus, this lack of affinity, along with the small spaces previously mentioned into which the solder must flow, contribute to effectively preclude satisfactory metallurgically bonded solder connections.

It is therefore an object of this invention to provide new and improved methods of fabricating wound electrical capacitors.

It is a further object of this invention to provide new and improved methods of fabricating wound electrical capacitors having superior terminations.

With these and other objects in view, the present invention contemplates an electrical capacitor having a pair of metallized dielectric strips convolutely wound into a roll. Each strip has an electrically conductive metal termination path on the metallized surface thereof adjacent one edge of the strip. The strips are arranged and laterally offset to expose each termination path at an opposite end of the roll, and electrical terminals are bonded by solder to each end of the roll. The present invention also contemplates methods of fabricating an electrical capacitor wherein a dielectric sheet is advanced into a vacuum deposition chamber and a metallized film is deposited on one surface of the dielectric sheet. Then, while still in the chamber, an electrically conductive metal termination path is deposited contiguous with the edge of the metallized film. Two such metallized dielectric sheets are then arranged, offset and convolutely wound into a capacitor roll so that the termination path of each strip is at an opposite end of the roll and is exposed for subsequent soldering. After the capacitor roll is wound, a terminal is placed at each end and molten solder is applied thereto to flow over the terminals and into the spaces formed between the successive convolutions of the roll. The metal of the termination path is selected so as to have, first, a resistance to deleterious oxidation, second, an affinity for solder, and third, the property of metallurgically effecting a bond between the metallized film and the solder. The solder thus readily flows into the small spaces or interstices to diffuse with the metal of the termination path and the contiguous unoxidized metallized film to form a metallurgical bond having excellent mechanical and electrical properties.

Other objects and advantages of the present invention will be apparent from the following detailed description when considered in conjunction with the accompanying drawings, wherein:

FIG. 1 is a diagrammatic view of suitable apparatus for vacuum depositing metallized films onto a dielectric sheet;

FIG. 2 is a plan view of a portion of a sheet of dielectric material showing bands of metallized film deposited thereon and metal termination paths deposited on selected portions of the metallized film;

FIG. 3 is a cross-sectional view along line 3—3 of the dielectric sheet shown in FIG. 2 further illustrating the positioning of the termination paths with respect to the bands of metallized film;

FIG. 4 is a partial cross-sectional view of a capacitor constructed in accordance with the principles of this invention showing the metallized film and termination paths greatly exaggerated with respect to the dielectric sheet; and FIG. 5 is a perspective view of a capacitor illustrating an electrical terminal connected thereto by solder which partially covers an end of the capacitor.

Referring now to FIG. 1, there is shown vacuum deposition apparatus for depositing bands of metallized film and metal termination paths on a continuous sheet 10 of dielectric material such as, for example, polycarbonate, polystyrene, or a plastic sold under the trademark Mylar. It is to be understood that the term "vacuum deposition apparatus" includes both sputtering and vaporizing devices as well as other devices for depositing metal in an atmosphere free of oxygen.

The vacuum deposition apparatus includes a vacuum deposition chamber 11 which is evacuated to a very low pressure by conventional vacuum pumps 12. A supply roll 13 of dielectric sheet material 10 is placed in the chamber 11 and advanced past a first vaporizing unit 14 in which a supply of metal, such as aluminum, is heated to the point of vaporization. Alternately, if desired, the supply roll 13 may be located outside the vacuum deposition chamber 11 and advanced thereinto through conventional vacuum seals. The metal vaporized in unit 14 passes through openings in a mask 15 and is deposited on specific portions of the dielectric material 10 to form wide bands of metallized film 16 having a uniform thickness ranging from approximately 1.5 to 15.0 millionths of an inch.

The metallized dielectric sheet continues past a second vaporizing unit 17 which has a supply of metal therein also heated to the point of vaporization. This vaporized metal passes through openings in a second mask 18 to form narrow metal termination paths 19 centrally located on each band of the metallized film 16 as shown in FIG. 2. The metal termination paths 19 are of uniform thickness of approximately 3 millionths of an inch and are composed of either gold, platinum, silver, copper, zinc, iridium, lead, indium, tin, or other suitable metals which (1) do not deleteriously oxidize when exposed to the atmosphere, (2) have an affinity for solder or are solder wettable, and (3) have the metallurgical characteristics of being diffusible in solder so as to form a metallurgical bond between the solder and the metallized film 16.

The termination paths 19 are deposited on the bands of metallized film 16 before the metallized dielectric sheet is removed from the vacuum deposition chamber 11 and exposed to the atmosphere. This insures that the termination paths 19 are deposited on an unoxidized metallized film 16. The termination paths 19 then act as a shield to prevent oxidation of the contiguous portions of the metallized film 16 upon subsequent exposure to the atmosphere. Thus, no oxide barriers are later formed on the metallized film 16 to prevent metallurgical bonding between the metallized film 16 and a solder applied thereto. Of course, if for some reason the metallized film 16 were permitted to oxidize before the termination paths 19 were deposited thereon, then, in accordance with the principles of this invention, it would be necessary to remove the oxide by mechanical, chemical, ultrasonic or other treatment before depositing the termination paths 19.

After the termination paths 19 are deposited, the metallized dielectric material is either wound on a take-up reel 20, as shown in FIG. 1, or advanced directly out of the vacuum deposition chamber 11 through conventional vacuum seals.

Since occasionally there are weak spots or holes in the dielectric material 10 providing current leakage paths therethrough, it may be advantageous to pass the metallized dielectric sheet through an oxidizing chamber (not shown) to form an oxide coating over the exposed aluminum film 16. In this manner, the aluminum oxide, which is a good dielectric, forms a protective dielectric coating to minimize current leakage particularly in the weak or broken areas of the dielectric material 10. This oxidizing step has no adverse effect on the subsequent soldering of terminals to the aluminum film 16 since the termination paths 19 are composed of a metal which does not oxidize deleteriously.

Referring now to FIGS. 2 and 3, one configuration of a metallized dielectric sheet is shown after advancing out of the vacuum deposition chamber 11. Here the dielectric sheet 10 has several bands of metallized film 16 deposited on selected portions thereof with the termination paths 19 centrally deposited on each band. It is to be noted that FIGS. 2 and 3 are merely illustrative of one of any number of different configurations which can be obtained by passing different widths of dielectric material 10 through the chamber 11 and utilizing a series of masks similar to masks 15 and 18. For example, it is only necessary that a dielectric sheet have a configuration such as that shown in FIGS. 2 and 3 between the lines A—A and B—B. However, it is more expedient to fabricate a dielectric sheet having a plurality of bands of metallized film 16 deposited thereon as shown in FIG. 2.

After the metallized film 16 and the termination paths 19 are deposited on the dielectric sheet 10, the sheet is cut or slit along the lines A—A, B—B and C—C as shown in FIGS. 2 and 3 to provide a plurality of strips having a metallized film 16 deposited on one surface of the dielectric sheet 10 and also having a narrow termination path 19 deposited on the metallized film 16 adjacent one edge thereof.

After the slitting operation, one metallized dielectric strip is superimposed on top of another. The strips are arranged so that the termination paths 19 are located at opposite sides with respect to one another and the dielectric material 10 of one strip is adjacent the metallized film 16 of the other strip. The strips are also laterally offset, as shown in FIG. 4, to expose the termination paths 19.

The two strips are then convolutely wound to form a capacitor roll 21, as shown in FIG. 4. While only a few convolutions are shown, it is to be understood that any number of convolutions can be utilized depending upon the rating of the capacitor. By offsetting the metallized dielectric strips, small spaces or interstices 22 are provided in the wound capacitor roll 21 to allow a solder to flow inwardly to contact the termination paths 19.

After the metallized dielectric strips are wound, a pair of terminals 23 are positioned against each end of the capacitor roll 21 and molten solder 24 is applied thereto. Since the metal selected for the termination paths 19 has an affinity for solder, the solder 24 is drawn into the interstices 22 and flows over the termination paths 19. The molten solder 24 then diffuses through the termination paths 19 to form a complex alloy and a metallurgical bond with the metallized film 16 to provide a strong electrical and mechanical connection between the terminals 23 and their respective metallized films 16. It is to be noted that the affinity of the termination path metal for solder obviates the necessity of forcing or spraying solder into the interstices 22; hence, dip soldering may be used as effectively as spray soldering.

The edges 26 of each dielectric strip act as an abutment, as shown in FIG. 4, to preclude the solder 24 from flowing through the interstices 22 to contact the metallized film 16 of the adjacent dielectric strip. An uncoated margin 27 is also provided on each dielectric strip so that the metallized film 16 thereof is separated from the solder 24 abutting against its respective edge 26. The spaces 28 between the uncoated margins 27 and the adjacent dielectric strip are exaggerated in FIG. 4 and are slightly smaller than the thickness of the metallized film 16 due to the compressive effects of winding the two dielectric strips. These small spaces 28 provide highly restricted passageways which effectively stop the solder 24 at the edges 26.

It is to be noted that without the solder wettable termination paths 19 solder would not readily be attracted to the non-wettable oxide coated metallized films 16 and hence would not be drawn into the interstices 22. Furthermore, the oxide barrier on the metallized films 16 would prevent the metallurgical bonding of the solder 24 thereto. The termination paths 19, in addition to facilitating the soldering of terminals 23 to the metallized film 16, provide a low electrical resistance and in effect act as bus bars to insure good electrical contact between the terminals 23 and their respective metallized films 16, even if the solder 24 does not completely contact the termination paths 19 at every convolution of the wound capacitor roll 21. Thus, it is possible to solder only a partial area of each end of the capacitor roll 21 as is shown in FIG. 5. This may be desirable since capacitors are often subjected to heat treatment after fabrication to remove gases from the interior thereof and it is necessary to provide partially open ends to permit such gases to escape.

The following example is given to illustrate the invention: A polycarbonate dielectric sheet having a thickness of .00017 inch was advanced into a vacuum chamber maintained at a pressure below 1.0 micron of Hg. A uniform film of aluminum having a thickness of approximately .000005 inch was vapor deposited onto the polycarbonate sheet. Then gold termination paths having a thickness of approximately .000003 inch were vapor deposited on selected portions of the aluminum film. The metallized sheet was then slit into a plurality of strips ¾ of an inch wide. The width of the aluminum film was approximately 11/16 of an inch and the width of the gold termination path was approximately 1/32 of an inch. One of the strips was then superimposed on another and arranged and offset to expose the termination paths as shown in FIG. 4. The two strips were then convolutely wound into a capacitor roll. Afterwards, terminals were positioned against each end of the roll and solder was applied thereto to connect each terminal to its respective aluminum film.

It was found that the capacitor thus made experienced no difficulty with poor solder connections even under the most adverse conditions. Furthermore, measurements showed exceptionally low termination losses and life testing under accelerated conditions indicated long time stability.

It is to be understood that the above-described example is merely illustrative of an application of the principles of the invention, and many other modifications may be made without departing from the invention.

What is claimed is:
1. A method of manufacturing an electrical capacitor comprising:
   depositing an aluminum film on one surface of a dielectric strip while in a protective atmosphere;
   depositing an electrically conductive metal termination path on the aluminum film adjacent the edge thereof while still in said protective atmosphere; passing the dielectric strip into an oxidizing chamber to oxidize the aluminum film;
   overlapping two of such strips so that the termination path of each strip is exposed and is located at an opposite side edge with respect to the other termination path;
   convolutely winding said strips into a roll;
   positioning a terminal against each end of said roll; and
   applying solder to said ends to bond said terminals thereto.

2. A method of fabricating an electrical capacitor comprising:
   advancing a dielectric sheet into a vacuum deposition chamber;
   depositing bands of aluminum film on said dielectric sheet;
   depositing gold termination paths on selected portions of said aluminum film before leaving said chamber;
   passing said dielectric sheet into an oxidizing chamber to oxidize said aluminum film;
   longitudinally cutting said dielectric sheet into strips, each having a gold termination path adjacent one edge thereof;
   overlapping two of said strips so that said termination paths are exposed and are located at opposite side edges of said strips;
   convolutely winding said strips into a roll;
   positioning a terminal against each end of said roll; and
   applying solder to said ends whereupon said solder diffuses through said gold termination paths to alloy with said aluminum film to electrically and mechanically connect said terminals with said aluminum film.

References Cited by the Examiner
UNITED STATES PATENTS

| 2,305,849 | 12/1942 | Dorn | 317—258 X |
| 2,435,441 | 2/1948 | Grouse. | |
| 2,899,345 | 8/1959 | Oshry | 317—258 X |

References Cited by the Applicant
UNITED STATES PATENTS

| 2,323,020 | 6/1943 | Dorn. |
| 2,740,732 | 4/1956 | Peck et al. |
| 2,797,373 | 6/1957 | Peck. |

LEWIS H. MYERS, *Primary Examiner.*

E. GOLDBERG, *Assistant Examiner.*